(12) United States Patent
Son (10) Patent No.: US 10,504,674 B2
(45) Date of Patent: Dec. 10, 2019

(54) DC ADAPTOR FOR DRIVING MAGNETIC CONTACTOR

(71) Applicant: Yeon Hee Seo, Uiwang-si, Gyeonggi-do (KR)

(72) Inventor: Sung Min Son, Seoul (KR)

(73) Assignee: Yeon Hee Seo, Uiwang-si (KR)

(*) Notice: Subject to any disclaimer, the term of this patent is extended or adjusted under 35 U.S.C. 154(b) by 0 days.

(21) Appl. No.: 16/354,469

(22) Filed: Mar. 15, 2019

(65) Prior Publication Data

US 2019/0295795 A1 Sep. 26, 2019

(30) Foreign Application Priority Data

Mar. 20, 2018 (KR) .................. 10-2018-0032141

(51) Int. Cl.
| | |
|---|---|
| *H01H 47/22* | (2006.01) |
| *H01H 50/16* | (2006.01) |
| *H01H 50/54* | (2006.01) |
| *H01H 50/44* | (2006.01) |
| *H02M 7/06* | (2006.01) |

(52) U.S. Cl.
CPC ............ *H01H 47/22* (2013.01); *H01H 50/16* (2013.01); *H01H 50/44* (2013.01); *H01H 50/54* (2013.01); *H02M 7/06* (2013.01)

(58) Field of Classification Search
CPC ........ H01H 47/22; H01H 50/16; H01H 50/44; H01H 50/54; H02M 7/06
USPC ........................................................ 361/152
See application file for complete search history.

(56) References Cited

FOREIGN PATENT DOCUMENTS

| JP | 2017-174765 A | 9/2017 |
|---|---|---|
| JP | 2017-175566 A | 9/2017 |
| KR | 20-0222138 Y1 | 5/2001 |
| KR | 20-0428459 Y1 | 10/2006 |
| KR | 10-1364634 B1 | 2/2014 |
| KR | 10-2016-0057126 A | 5/2016 |
| KR | 10-2016-0059749 A | 5/2016 |
| KR | 10-2016-0085412 A | 7/2016 |
| KR | 10-2016-0121965 A | 10/2016 |

OTHER PUBLICATIONS

Machine translation of Han et al. Korean Patent Document KR 10-2016-0057126 A May 23, 2016 (Year: 2016).*

(Continued)

*Primary Examiner* — Kevin J Comber
(74) *Attorney, Agent, or Firm* — Studebaker & Brackett PC (57) ABSTRACT

Disclosed is a DC adaptor for driving a magnetic contactor including at least: an AC input terminal; a capacitor connected to the AC input terminal; an electronic switch connected to the capacitor in parallel; a full-wave rectifier which converts an AC current into a DC current; a DC output connecting line which receives the DC current from the full-wave rectifier to transmit the DC current to the magnetic contactor; a sensing unit which measures a current value of a driving coil of the magnetic contactor; a controller which compares the measured current value with a reference value to output an on/off control signal of the electronic switch; a DC power source which generates a DC power using the DC current converted by the full-wave rectifier; and a housing which accommodates the above elements.

3 Claims, 10 Drawing Sheets

(56) References Cited

OTHER PUBLICATIONS

Office Action issued in KR 10-2018-003214; mailed by the Korean Intellectual Property Office dated Jul. 19, 2018.
Office Action issued in KR 10-2018-003214; mailed by the Korean Intellectual Property Office dated Jun. 8, 2018.

\* cited by examiner

AC DRIVING CURRNET

FIG. 2B

ELECTROMAGNETIC FORCE BY AC
DRIVING CURRENT

FIG. 3A

SIDE VIEW

FIG. 3B

FRONT VIEW

DC ADAPTOR FOR DRIVING MAGNETIC CONTACTOR

CROSS-REFERENCE TO RELATED APPLICATIONS

This application claims the priority of Korean Patent Application No. 10-2018-0032141 filed on Mar. 20, 2018, in the Korean Intellectual Property Office, the disclosure of which is incorporated herein by reference.

BACKGROUND

Field

The present disclosure relates to a DC adaptor for driving a magnetic contactor, and more particularly, to a DC adaptor for driving a magnetic contactor which is capable of reducing power consumption as compared with an AC driving magnetic contactor, being connected to all AC magnetic contactors which satisfy the KS standard, and providing protection against an instantaneous power failure and short-time voltage drop.

Description of the Related Art

A magnetic contactor is a device which shuts off or turns on the flow of electricity using an electromagnet.

Figure 1:
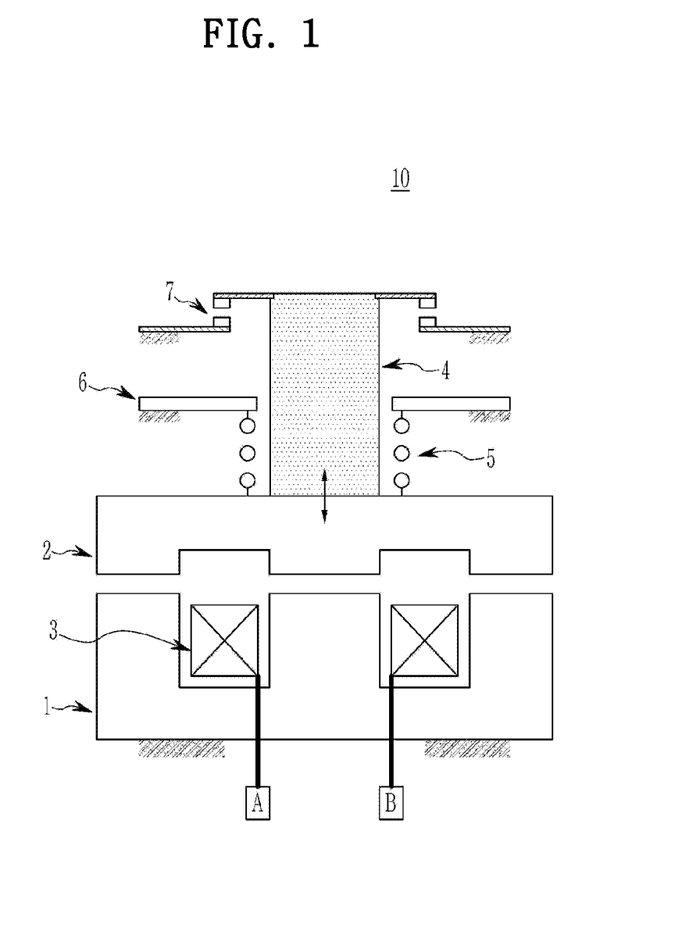
FIG. 1 illustrates an example of a magnetic contactor.

FIG. 1 illustrates an example of a magnetic contactor 10.

Referring to FIG. 1, the magnetic contactor 10 includes a fixed core 1, a movable core 2, a driving coil 3, a connecting rod 4, a spring 5, a fixing frame 6, a primary contact 7, and power connection terminals A and B.

The driving coil 3 is installed in the fixed core 1. When current flows to the driving coil 3 through the power connection terminals A and B, electromagnetic force is generated to cause the movable core 2 to be attracted to the fixed core 1. When the movable core 2 is attracted to the fixed core 1, the primary contact 7 is turned on.

There are two methods for driving the electromagnet in the magnetic contactor.

One is a method for driving the magnetic contactor by an AC current and the other one is a method for driving the magnetic contact by a DC current.

Figure 2A:
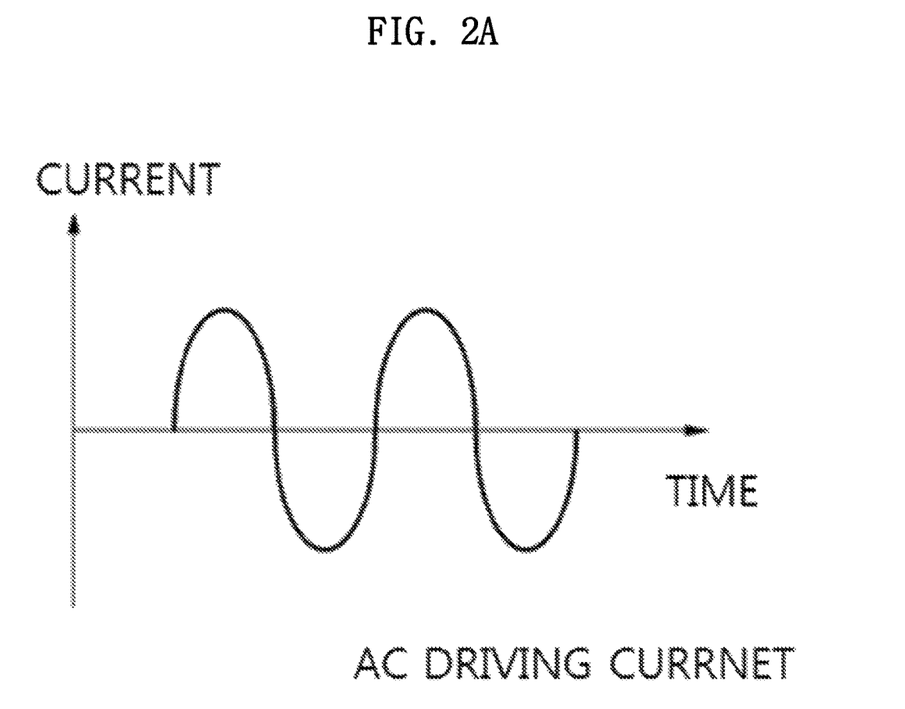
FIGS. 2A and 2B illustrate an electromagnetic force of a magnetic contactor which is driven by an AC current.
Figure 2B:
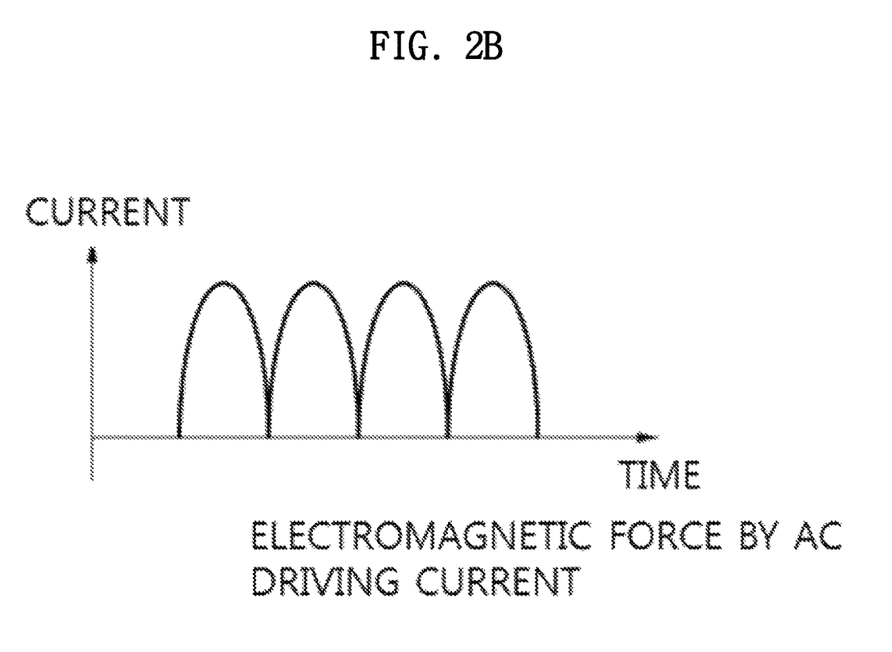

FIGS. 2A and 2B illustrate an electromagnetic force of the magnetic contactor driven by the AC current in which FIG. 2A illustrates an AC driving current in accordance with a time and FIG. 2B illustrates a electromagnetic force by the AC driving current in accordance with a time.

Referring to FIGS. 1, 2A and 2B, when the magnetic contactor is driven by the AC current, the electromagnetic force generated in the electromagnet pulsates. That is, since an attractive force pulsates, the movable core 2 is attracted to the fixed core 1, but vibration and noise may be slightly generated.

Further, in order for the movable core 2 to be stably attached to the fixed core 1, a large amount of AC currents needs to be supplied. Therefore, there is a problem in that a resistance loss occurs in the driving coil 3 and a large amount of iron loss occurs in the fixed core 1 and the movable core 2.

Further, when the magnetic contactor 10 is driven by the AC current, there is a problem in that the magnetic contactor 10 is turned off even if the power source voltage is instantaneously blocked out, for example, is blocked out for only one cycle. Further, even when the power source voltage drops to approximately 40% of a rated voltage, there is a problem in that the magnetic contactor 10 is open.

Further, in the case of 220V-20A AC magnetic contactor which is currently commercialized, a power consumption is approximately 2 W so that the electromagnet is consistently driven in an on-state so that a standby power consumption is wasted.

(Patent Document 1) Korean Unexamined Patent Application Publication No. 10-2016-0121965

SUMMARY

An object to be achieved by the present disclosure is to provide a DC adaptor for driving a magnetic contactor which drives a magnetic contactor by a DC current to reduce power consumption and includes an AC input terminal and a DC output connecting line to be connected to all AC magnetic contactors which satisfy the KS standard.

Another object of the present disclosure is to provide a DC adaptor for driving a magnetic contactor which provides protection against a low voltage and an instantaneous power failure.

According to an aspect of the present disclosure, an AC adaptor for driving a magnetic contactor includes: an AC input terminal; a capacitor connected to the AC input terminal; an electronic switch which is connected to the capacitor in parallel; a full-wave rectifier which converts an AC current transmitted through the capacitor or the electronic switch into a DC current; a DC output connecting line which receives the DC current from the full-wave rectifier to transmit the DC current to the magnetic contactor; a sensing unit which measures a current value of a driving coil of the magnetic contactor; a controller which compares the measured current value with a reference value to output an on/off control signal of the electronic switch; a DC power source which generates a DC power required for an operation of the controller using the DC current converted by the full-wave rectifier; and a housing which accommodates the capacitor, the electronic switch, the full-wave rectifier, the sensing unit, the controller, and the DC power source, The controller may output an on control signal of the electronic switch when the measured current value is lower than a first reference value and outputs an off control signal of the electronic switch after elapse of a predetermined time.

In this case, the predetermined time may be 0.1 to 0.2 seconds.

The controller may output an on control signal of the electronic switch when the measured current value is lower than a second reference value and output an off control signal of the electronic switch when the measured current value is equal to or higher than a second reference value.

The electronic switch may be a photo TRIAC.

According to the present disclosure, the magnetic contactor is driven by a DC current to reduce power consumption, an AC input terminal and a DC output connecting line are provided to be connected to all AC magnetic contactors which satisfy the KS standard.

According to the present disclosure, an electronic switch is repeatedly on/off so that the protection is possible even at a low power source voltage.

According to the present disclosure, even when the power source voltage instantaneously stops for approximately one cycle, the DC current which flows through a driving coil is gradually reduced due to an inductance of the driving coil, so that the attractive force is maintained for approximately one cycle, thereby providing protection against the instantaneous power failure of the power source.

According to the present disclosure, it is possible to achieve the effect of maintaining the driving current at the time of starting the magnetic contactor and dropping the power source voltage.

A technical object to be achieved in the present disclosure is not limited to the aforementioned effects, and another not-mentioned effect will be obviously understood by those skilled in the art from the description below.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE INVENTION

It should be noted that technical terminologies used in the present specification are used to describe a specific exemplary embodiment but are not intended to limit the present invention. Further, the technical terminologies which are used in the present specification should be interpreted to have meanings that are generally understood by those with ordinary skill in the art to which the present invention pertains, unless specifically defined to have different meanings in the present invention, but not be interpreted as an excessively comprehensive meaning or an excessively restricted meaning. Further, if a technical terminology used in the present specification is an incorrect technical terminology which does not precisely describe the spirit of the present invention, the technical terminology should be replaced with and understood as a technical terminology which may be correctly understood by those skilled in the art.

Further, a general terminology used in the present disclosure should be interpreted as defined in a dictionary or in accordance with the context, but not be interpreted as an excessively restricted meaning.

A singular form used in the present specification may include a plural form unless it has a clearly opposite meaning in the context. Terminologies such as "be configured by" or "include" in the present disclosure should not be interpreted to necessarily include all of plural components or plural steps described in the present specification, but should be interpreted not to include some of the components or steps or to further include additional components or steps.

Hereinafter, the present disclosure will be described in more detail through exemplary embodiments, but the scope of the present disclosure is not limited thereto.

Figure 3A:
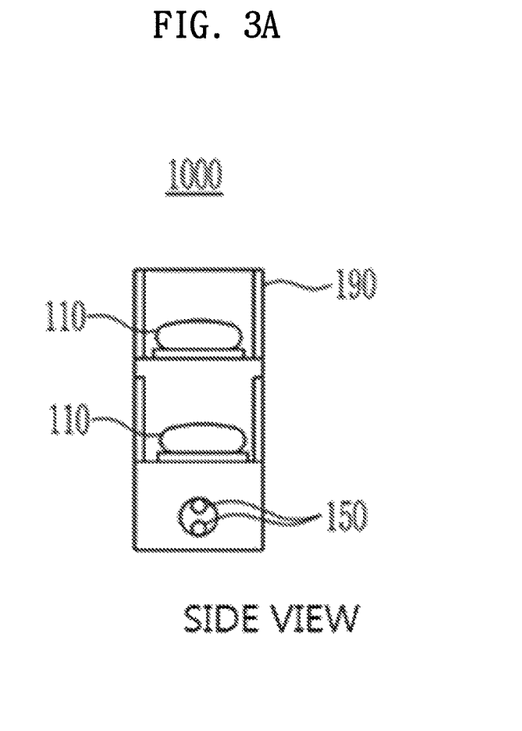
FIGS. 3A and 3B schematically illustrate an exterior appearance of a DC adaptor for driving a magnetic contactor according to an exemplary embodiment of the present disclosure.
Figure 3B:
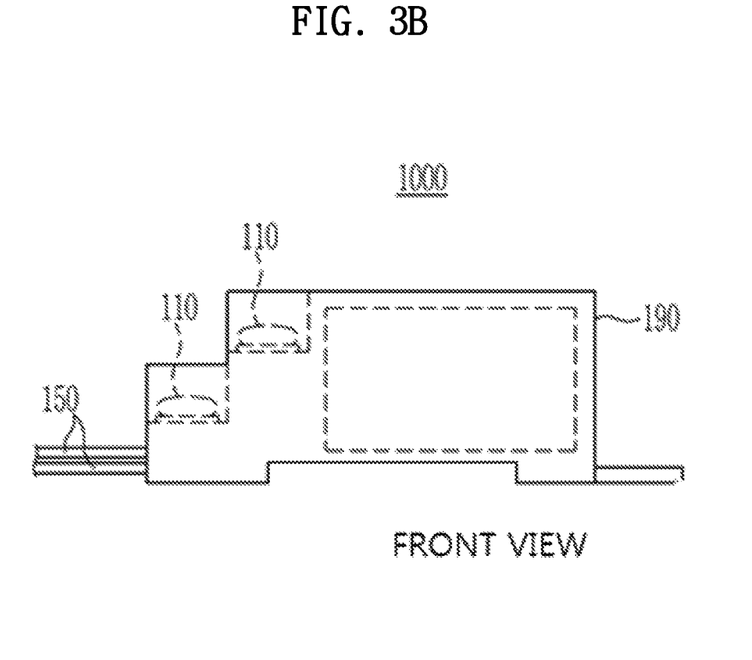

FIGS. 3A and 3B schematically illustrate an exterior appearance of a DC adaptor for driving a magnetic contactor according to an exemplary embodiment of the present disclosure in which FIG. 3A is a side view of an exterior appearance of a DC adaptor for driving a magnetic contactor according to the present disclosure and FIG. 3B is a front view of an exterior appearance of a DC adaptor for driving a magnetic contactor according to the present disclosure.

Referring to FIGS. 3A and 3B, a DC adaptor 1000 for driving a magnetic contactor according to the present disclosure includes an AC input terminal 110, a DC output connecting line 150, and a housing 190.

An AC power source (not illustrated) is connected to the AC input terminal 110 and a magnetic contactor (not illustrated) is connected to the DC output connecting line 150. Therefore, the DC adaptor 1000 for driving a magnetic contactor according to the present disclosure may be connected to any of AC magnetic contactors if it satisfies a KS standard.

In the housing 190, a capacitor, an electronic switch, a full-wave rectifier, a sensing unit, a controller, and a DC power source are accommodated.

Figure 4:
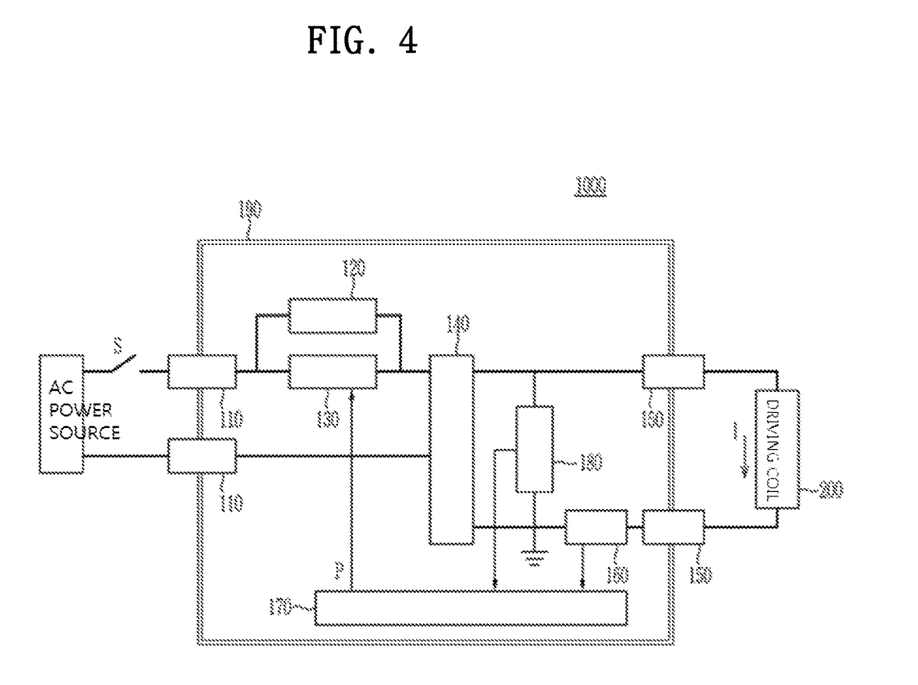
FIG. 4 schematically illustrates a block diagram of a DC adaptor for driving a magnetic contactor according to an exemplary embodiment of the present disclosure.
Figure 5:
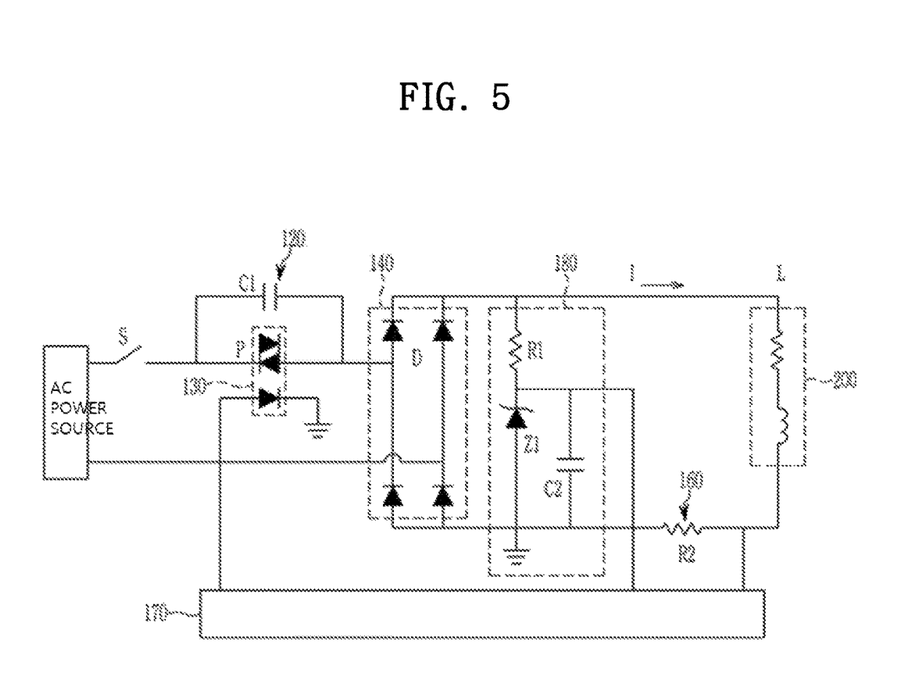
FIG. 5 schematically illustrates a circuit diagram of a DC adaptor for driving a magnetic contactor according to an exemplary embodiment of the present disclosure.

FIG. 4 schematically illustrates a block diagram of a DC adaptor for driving a magnetic contactor according to an exemplary embodiment of the present disclosure. FIG. 5 schematically illustrates a circuit diagram of a DC adaptor for driving a magnetic contactor according to an exemplary embodiment of the present disclosure.

Referring to FIGS. 4 and 5, a DC adaptor 1000 for driving a magnetic contactor according to the present disclosure includes an AC input terminal 110, a capacitor 120, an electronic switch 130, a full-wave rectifier 140, a DC output connecting line 150, a sensing unit 160, a controller 170, a DC power source 180, and a housing 190.

The AC power source is connected to the AC input terminal 110 so that an AC current is supplied.

The capacitor 120 is connected to the AC input terminal 110 to be supplied with an AC current.

The electronic switch 130 is connected to the capacitor 120 in parallel and is turned on or off by an on/off control signal of the controller 170 to be described below. The electronic switch 130 is a switch through which the AC current flows and desirably, may be a photo TRIAC P, but is not necessarily limited thereto.

The full-wave rectifier 140 converts the AC current transmitted through the capacitor 120 or the electronic switch 130 into a DC current. The full-wave rectifier 140 may be a bridge diode, but is not necessarily limited thereto.

The DC output connecting line 150 is supplied with the DC current from the full-wave rectifier 140 to transmit the DC current to the magnetic contactor, more specifically, to a driving coil 200 of the magnetic contactor. The driving coil 200 magnetizes a fixed core (denoted by a reference numeral 1 in FIG. 1) of the magnetic contactor.

The sensing unit 160 measures a current value flowing through the driving coil 200 of the magnetic contactor. The sensing unit 160 may directly measure a current or calculate the current using a measured voltage after measuring the voltage. The sensing unit 160 may be a resistor R2, but is not necessarily limited thereto.

The controller 170 compares the current value measured by the sensing unit 160 with a predetermined reference value to output an on/off control signal of the electronic switch 160. The controller 170 may be a microprocessor, but is not necessarily limited thereto.

The DC power source 180 generates a DC power required for the operation of the controller 170 using the DC current converted by the full-wave rectifier 140. The DC power source 180 may include a resistor R1, a Zener diode Z1, and a capacitor C2.

The housing 190 accommodates the capacitor, the electronic switch, the full-wave rectifier, the sensing unit, the controller, and the DC power source.

Figure 6:
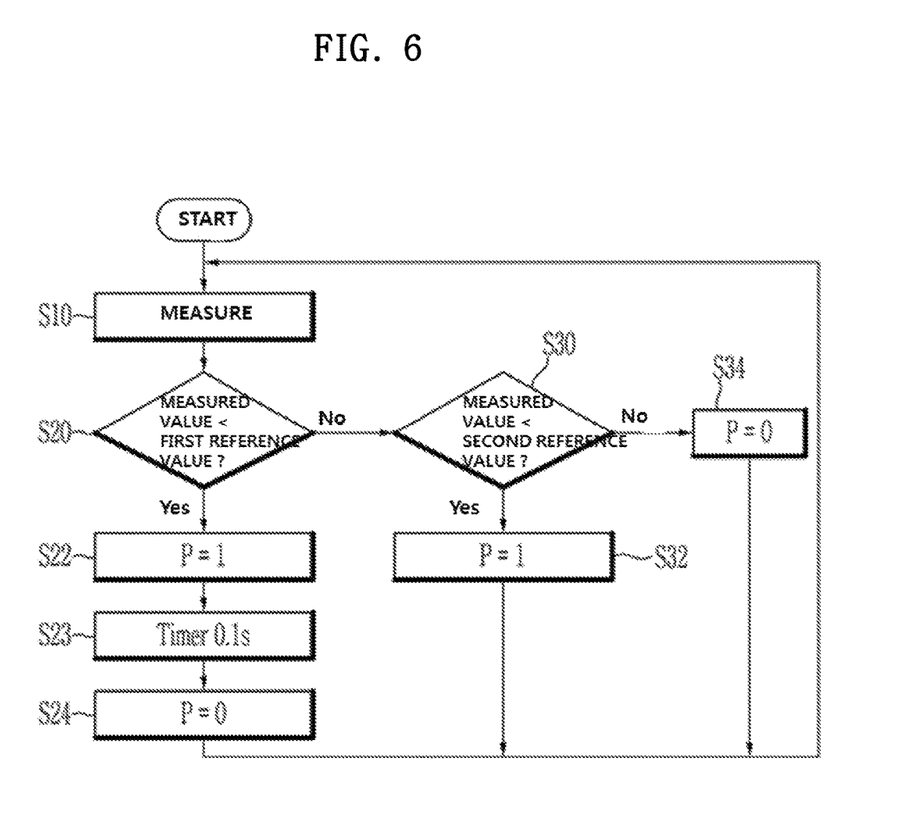
FIG. 6 is a control flowchart by a DC adaptor for driving a magnetic contactor according to an exemplary embodiment of the present disclosure.
Figure 7:
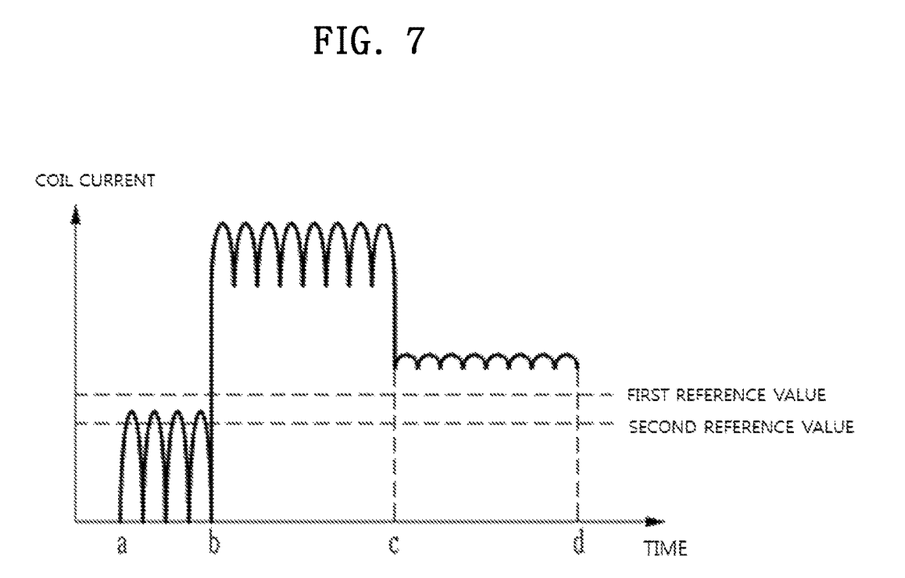
FIG. 7 schematically illustrates a current waveform of a driving coil in accordance with a time when a DC adaptor for driving a magnetic contactor according to an exemplary embodiment of the present disclosure is used.
Figure 8:
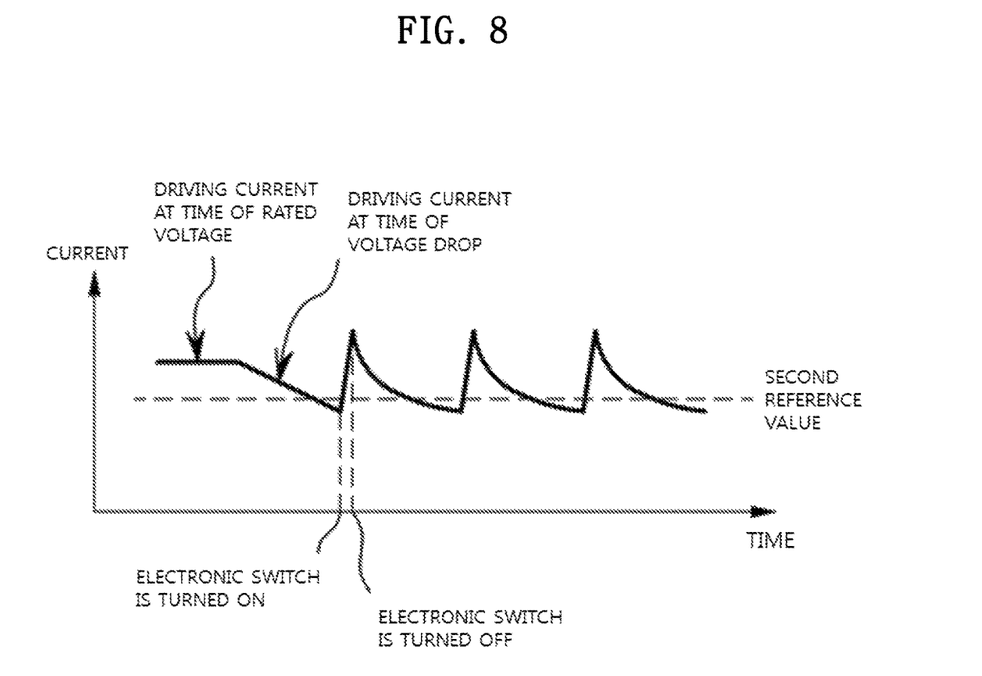
FIG. 8 illustrates current control by turning on/off an electronic switch in a magnetic contactor according to an exemplary embodiment of the present disclosure.

FIG. 6 is a control flowchart by a DC adaptor for driving a magnetic contactor according to an exemplary embodiment of the present disclosure. FIG. 7 schematically illustrates a current waveform of a driving coil in accordance with a time when a DC adaptor for driving a magnetic contactor according to an exemplary embodiment of the present disclosure is used. FIG. 8 illustrates current control by turning on/off an electronic switch in a magnetic contactor according to an exemplary embodiment of the present disclosure.

Referring to FIGS. 5 to 8, when the AC power is applied through the AC input terminal 110, the AC current flows through the capacitor 120. The AC current is converted into a DC current by the full-wave rectifier 140. The converted DC current is transmitted to the driving coil 200 of the magnetic contactor through the DC output connecting line 150.

However, in this case, the DC current flowing through the driving coil 200 severely pulsates as illustrated in a section [a-b] of FIG. 7 and a value is too small to operate the magnetic contactor. However, the voltage of the DC power increases by the current. That is, the DC power source 180 generates a DC power required for the operation of the controller 170 using the DC current converted by the full-wave rectifier 140.

When the voltage of the DC power increases by an amount required for the operation of the controller 170, the controller 170 starts operation and the sensing unit 160 measures the DC current flowing through the driving coil 200 in step S10.

The controller 170 compares whether the measured value of the DC current is lower than a first reference value in step S20. When the measured value of the DC current is lower than the first reference value, the controller 170 outputs an on control signal (P=1) of the electronic switch 130 in step S22. By doing this, the electronic switch 130 is turned on and the AC current flows through the electronic switch 130 as illustrated in a section [b-c] of FIG. 7, without passing through the capacitor 120. The AC current is converted into a DC current by the full-wave rectifier 140 and the converted DC current is transmitted to the driving coil 200 of the magnetic contactor. In this case, since the driving current is high, an attractive force of the electromagnet is increased so that the movable core 2 of the magnetic contactor is attracted to the fixed core 1. In this case, the first reference value may be 18 mA.

After maintaining this state by a timer, desirably for one to two seconds, more desirably for one second in step S23, the controller 170 outputs an off control signal (P=0) of the electronic switch 130. By doing this, the electronic switch 130 is turned off and the AC current flows via the capacitor 120 as illustrated in a section [c-d] of FIG. 7. The AC current is converted into a DC current by the full-wave rectifier 140 and the converted DC current is transmitted to the driving coil 200 of the magnetic contactor.

Since the movable core 2 of the magnetic contactor is already attracted to the fixed core 1, an inductance of the driving coil 200 increases so that the current flowing through the driving coil 200 hardly pulsates. Further, even though the current value flowing through the driving coil 200 is low, a sufficient attractive force is generated so that the movable core 2 is continuously attracted to the fixed core 1. As a result, the magnetic contactor is normally driven.

However, when the power voltage drops, the driving current also decreases, so that when the power voltage drops to approximately 80% or lower of a rated voltage, the driving current flowing through the driving coil 200 decreases to be lower than a second reference value. The sensing unit 160 measures the current flowing through the driving coil 200 in step S30. As illustrated in FIG. 8, when the measured value is smaller than the second reference value, the controller 170 outputs an on control signal (P=1) of the electronic switch 130 in step S32. By doing this, the electronic switch 130 is turned on so that the driving current increases. However, when the driving current is equal to or higher than the second reference value by doing this, the controller 170 outputs the off control signal (P=0) of the electronic switch 130 in step S34. In this case, the second reference value may be 22 mA.

By doing this, when the electronic switch 130 is turned off, the increased driving current decreases. In this case, since the inductance of the driving coil 200 is high, the driving current slowly decreases.

When the driving current is lower than the second reference value again, the controller 170 outputs the on control signal (P=1) of the electronic switch 130 and when the driving current increases again to be equal to or higher than the second reference value, the controller 170 outputs the off control signal (P=0) of the electronic switch 130 in step S34. This process is continuously repeated.

According to the present disclosure, the electronic switch is repeatedly turned on or off so that even though the power voltage drops to 40% of the rated voltage to be a low voltage, the magnetic contactor is maintained to be normal.

Further, even though the power voltage instantaneously stops for approximately one cycle, the DC current flowing through the driving coil slowly decreases due to the inductance of the driving coil. Therefore, the attractive force is maintained for one cycle so that the instantaneous power failure of the power source may be protected.

To more specifically describe FIG. 7, in the section [a-b], the pulsation is severe and the current value is low so that the attractive force of the electromagnet is low. Therefore, the movable core 2 of the magnetic contactor is not attractive to the fixed core 1.

In the section [b-c], since the current of the driving coil is high, an attractive force of the electromagnet is increased so that the movable core 2 of the magnetic contactor is attracted to the fixed core 1.

In the section [c-d], the movable core 2 of the magnetic contactor is continuously attracted to the fixed core 1 so that the magnetic contactor normally operates.

Although the specific exemplary embodiment of the present disclosure has been described above, the present disclosure is not limited to the above-described specific exemplary embodiment. It will be understood by those skilled in the art that various changes and modification may be made without departing from the scope of the present disclosure and such modification is within the scope of the claims.

What is claimed is:

1. A DC adaptor for driving a magnetic contactor, comprising:
- an AC input terminal;
- a capacitor connected to the AC input terminal;
- an electronic switch which is connected to the capacitor in parallel;
- a full-wave rectifier which converts an AC current transmitted through the capacitor or the electronic switch into a DC current;
- a DC output connecting line which receives the DC current from the full-wave rectifier to transmit the DC current to the magnetic contactor;
- a sensing unit which measures a current value of a driving coil of the magnetic contactor;
- a controller which compares the measured current value with a reference value to output an on/off control signal of the electronic switch;
- a DC power source which generates a DC power required for an operation of the controller using the DC current converted by the full-wave rectifier; and
- a housing which accommodates the capacitor, the electronic switch, the full-wave rectifier, the sensing unit, the controller, and the DC power source, wherein the electronic switch is used at the time of starting the magnetic contactor and is controlled to be repeatedly on/off to maintain the driving current, the controller outputs an on control signal of the electronic switch when the measured current value is lower than a first reference value and outputs an off control signal of the electronic switch after elapse of a predetermined time, in order to start the magnetic contactor, and the controller outputs an on control signal of the electronic switch when the measured current value is lower than a second reference value and outputs an off control signal of the electronic switch when the measured current value is equal to or higher than the second reference value, in order to maintain the driving current.

2. The DC adaptor for driving a magnetic contactor according to claim 1, wherein the predetermined time is 0.1 seconds to 0.2 seconds.

3. The DC adaptor for driving a magnetic contactor according to claim 1, wherein the electronic switch is a photo TRIAC.

* * * * *